United States Patent Office 3,541,628
Patented Nov. 24, 1970

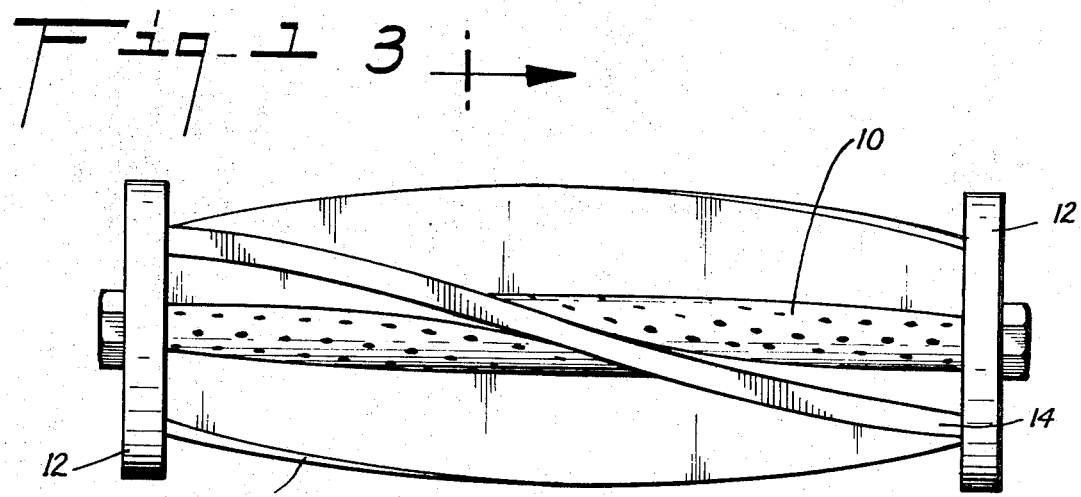
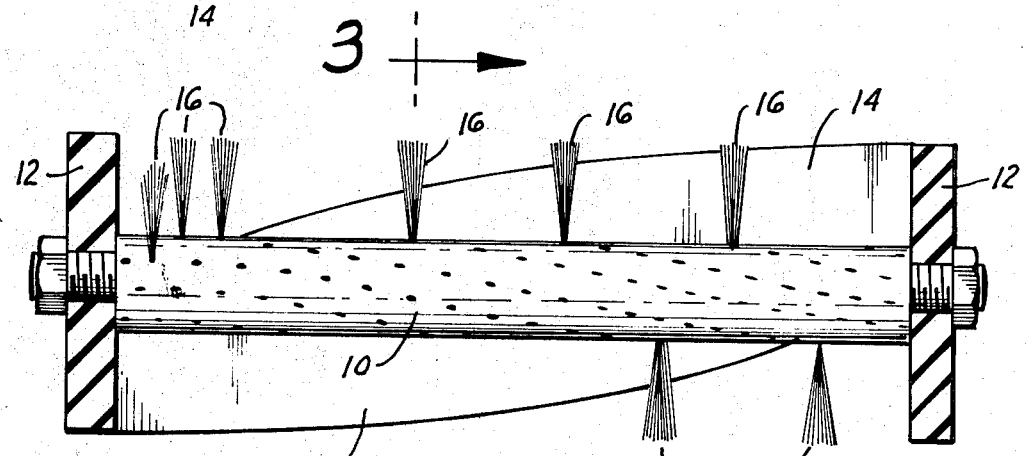
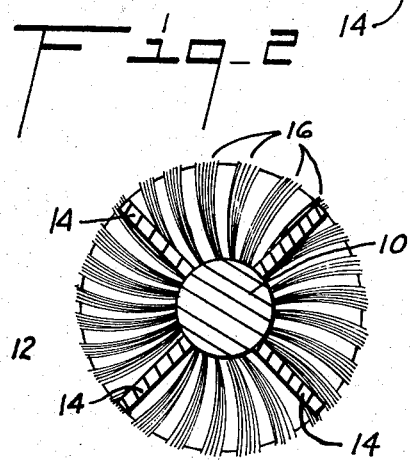
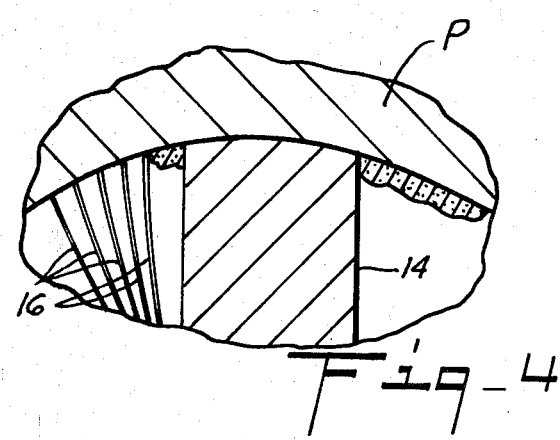
Harry J. Girard
INVENTOR.
BY Charles E. Lightfoot
ATTORNEY

3,541,628
ROTATABLE PIG FOR PIPE LINES
Harry J. Girard, Houston, Tex.
Filed June 28, 1968, Ser. No. 741,183
Int. Cl. B08b 9/04
U.S. Cl. 15—104.06                                4 Claims

ABSTRACT OF THE DISCLOSURE

A pipe line pig for use in pipe lines to be propelled therethrough by a pressure gradient in the line and including means positioned for engagement with deposited material in the pipe to cause the pig to rotate during movement of the pig along the pipe and also having means positioned for engagement with the internal surface of the pipe to brush or scratch such surface during rotational movement of the pig.

BACKGROUND OF THE INVENTION

In the operation and maintenance of pipe lines use is made of pigs for preventing the intermixing of liquids of different character which are to be transported through such lines, and for cleaning the lines by the wiping or scraping action of such pigs as they pass along the lines. Pigs for this purpose may be of a number of different shapes, such as balls or cylindrical plugs, and are usually made of resilient material such as rubber, foamed plastics, or the like.

Pigs of this kind are subject to a number of disadvantages, in that they may at times be rolled along the pipe under the influence of the pressure of the fluid flowing in the pipe, thus rapidly wearing the material away and permitting leakage of fluid past the pig, or, in the case of elongated cylindrical plugs, the lower surface portion of the pig is rapidly worn away, while at times such plugs are deformed or wrinkled under pressure so that they no longer effectively seal the pipe against the flow-by of fluid. Moreover, pigs of this kind, because of their relatively deformable or compressible character, may be squeezed through locations of reduced cross-sectional area in the pipe resulting from the formation of heavy or relatively hard deposits on the internal surface of the pipe without removing such deposits.

The present invention has for an important object the provision of a pipe line pig which is of durable construction capable of resisting the distorting or deforming action of the pressure in the pipe line and which is provided with means positioned for coaction with deposited material in the pipe to cause axial rotation of the pig during its movement along the pipe.

Another object of the invention is to provide a rotatable pipe line pig embodying means for brushing or scratching away deposits in the pipe during its travel therethrough.

A further object of the invention is to provide a pipe line pig in which the wear on the pig as it passes along the line will be substantially uniform on all portions of the pig which contact the surrounding wall of the pipe.

SUMMARY OF THE INVENTION

Briefly described the pig of the invention is constructed with a central, rigid core at whose opposite ends resilient seal forming members are carried which are shaped for sealing engagement with the surrounding wall of the pipe to close the pipe against the flow of fluid therein past the pig. Between the end sealing members, the rigid core is provided with radially extending fins or blades which are of spiral shape and whose outer edges are positioned to engage and cut into deposits on the internal surface of the pipe to cause the pig to rotate axially as it moves along the pipe. Abrading means in the form of bristles or wires is carried by the core, extending radially therefrom between the blades and of somewhat greater length than the radial extent of the blades so that the bristles will be somewhat flexed in the pipe to cause the ends of the bristles to scratch or brush away deposits in the pipe.

The various objects and obvious advantages of the invention may best be understood from the following detailed description of a preferred embodiment of the same when considered with the annexed drawings.

BRIEF DESCRIPTION OF THE FIGURES OF THE DRAWINGS

FIG. 1 is a side elevational view of a preferred embodiment of the pig of the invention;

FIG. 2 is a central, longitudinal, cross-sectional view of the pig as illustrated in FIG. 1;

FIG. 3 is a cross-sectional view, taken along the line 3—3 of FIG. 2, looking in the direction indicated by the arrows; and FIG. 4 is a fragmentary cross-sectional view, similar to that of FIG. 3, showing a portion of a pipe with a portion of a pig located therein in operating position.

DESCRIPTION OF A SPECIFIC EMBODIMENT OF THE INVENTION

Referring now to the drawings in greater detail the pig of the invention includes a rigid central shaft or core 10, upon whose opposite ends seal forming end members or bodies 12 are fixedly carried. The seal forming members 12 may be formed entirely of resilient material, such as molded rubber, plastics, or the like and of a size to be held in sealing contact with the internal surface of the pipe in which the pig is to be inserted, or these members may be of other suitable construction, not shown, such as rigid, annular bodies of smaller diameter than the internal diameter of the pipe and provided with seal forming means, such as resilient rim portions or rings, such as O-rings positioned for sealing engagement with the pipe to close the pipe against the flow of fluid therein past the pig. The seal forming members are preferably of a thickness to securely hold the core 10 in substantially concentric relation to the pipe.

Extending radially from the core 10 between the end members 12, the pig is provided with one or more rigid vanes or blades 14, rigidly attached to the core and whose outer edge portions are of spiral shape, as best seen in FIG. 1. The spiral of the outer edge portions of the vanes is preferably of relatively long pitch, so that the pig will be readily rotated by the vanes by the furrowing or grooving of material deposited on the internal surface of the pipe as the pig moves longitudinally through the pipe.

The outer edges of the vanes will be located in parallel, circumferentially spaced relation on a diameter to fit easily into the pipe nearly in contact with the internal surface of the pipe so that these edges will be positioned to cut through or form grooves in any material, such as paraffin, deposited on the internal surface of the pipe to cause the pig to rotate about its longitudinal axis as the pig moves longitudinally along the pipe line.

The end members 12 will be of a diameter somewhat greater than the diameter of the pipe, so that the end members will be in fluid tight sealing contact with the internal surface of the pipe when inserted therein with the outer edges of the vanes 14 in position to cut into the deposited material to cause the pig to rotate as the pig moves along the pipe.

Between the blades or vanes 14, the core 10 may be provided with bristles or wires 16 fixedly attached thereto and which are of a length to extend radially somewhat beyond the outer edges of the vanes when the pig is out of the pipe. The bristles form a brush on the pig, whose bristles will be flexed somewhat, as seen in FIG. 3, with the ends of the bristles in brushing contact with the internal surface of the pipe to clean the pipe as the pig rotates and moves longitudinally along the pipe.

In making use of the pig of the invention the pig is inserted into a pipe line, the end seal forming member 12 being compressed into the pipe into tight sealing contact therewith and the vanes 14 being in or nearly in contact with the internal surface of the pipe, while the brush portion of the pig will be in scratching contact therewith.

As the pig moves longitudinally in the pipe, the outer edges of the vanes will penetrate any deposited material, such as paraffin, which has formed on the interior of the pipe, causing the pig to rotate and the brushes to scratch off the deposited material. The end sealing members will, of course, close the pipe against the flow of fluid past the pig so that the pig will be propelled through the pipe by the pressure of the fluid flowing therethrough.

The pig may be of any desired length, and by suitably adjusting the size of the end sealing members 12 and the clearance of the vanes relative to the internal surface of the pipe, the pig may be constructed to readily pass through slight irregularities of the pipe.

It will thus be seen that the invention constructed and used as described above provides a pipe line pig which is capable of rotating as it moves through the pipe line and which effectively cleans the pipe by a scratch brush effect, while maintaining a fluid tight seal to prevent the flow of fluid past the pig.

The invention is disclosed herein in connection with a particular construction and arrangement of the parts which is intended by way of illustration only, and it will be understood that various changes can be made within the spirit of the invention and the scope of the appended claims.

Having thus clearly shown and described the invention, what is claimed as new and desired to secure by Letters Patent is:

1. A pig for insertion in a pipe line to be propelled therethrough by a pressure gradient in the line comprising
   (a) a central, elongated, rigid core,
   (b) seal forming members formed of resilient material on the core at longitudinally spaced locations thereon, shaped for sealing engagement with the surrounding wall of the pipe to close the pipe against the flow of fluid past the pig,
   (c) rigid means on the core between said members positioned for engagement with material deposited on said wall and shaped for coaction with such material to impart axial rotation to the pig upon movement of the pig longitudinally in the pipe, and
   (d) abrading means on the core extending radially therefrom and positioned for engagement with the surrounding wall of the pipe to scrape away such deposited material upon axial rotation of the pig.

2. The pig as defined in claim 1, wherein said abrading means is bristle-like.

3. The pig as defined in claim 1, wherein said rigid means are radially extending, peripherally spaced, parallel, longitudinally spiral vanes whose outer edges are positioned to penetrate said deposited material as the pig moves along the pipe, and wherein said abrading means extends radially outwardly between the vanes in position for engagement with the deposited material to scrape away such material as the pig rotates.

4. The pig as defined in claim 3, wherein said abrading means is bristle-like.

References Cited

UNITED STATES PATENTS

| | | | |
|---|---|---|---|
| 812,361 | 2/1906 | Pickles | 15—104.06 |
| 1,547,440 | 7/1925 | Penn | 15—104.06 |
| 1,588,765 | 6/1926 | Mannion et al. | 15—104.06 |
| 2,392,144 | 1/1946 | Hall | 15—104.06 |

EDWARD L. ROBERTS, Primary Examiner